United States Patent [19]

Kashio

[11] 4,133,041
[45] Jan. 2, 1979

[54] DATA PROCESSING CONTROL APPARATUS WITH SELECTIVE DATA READOUT

[75] Inventor: Toshio Kashio, Tokyo, Japan

[73] Assignee: Casio Computer Co., Ltd., Tokyo, Japan

[21] Appl. No.: 754,418

[22] Filed: Dec. 27, 1976

[30] Foreign Application Priority Data

Dec. 25, 1975 [JP] Japan .................... 50-156863

[51] Int. Cl.² .................... G06F 15/40; G06F 9/20
[52] U.S. Cl. .................... 364/900
[58] Field of Search .................... 364/900 MS File

[56] References Cited

U.S. PATENT DOCUMENTS

| 2,925,588 | 2/1960 | Sublette et al. | 340/174 |
| 3,107,343 | 10/1963 | Poole | 340/172.5 |
| 3,582,900 | 6/1971 | Goldman | 340/172.5 |
| 3,601,808 | 8/1971 | Vlack | 340/172.5 |
| 3,704,452 | 11/1972 | Beausoleil et al. | 340/172.5 |
| 3,729,712 | 4/1973 | Glassman | 340/172.5 |
| 3,931,612 | 1/1976 | Stevens et al. | 340/172.5 |

*Primary Examiner*—Gareth D. Shaw
*Assistant Examiner*—C. T. Bartz
*Attorney, Agent, or Firm*—Flynn & Frishauf

[57] ABSTRACT

A data processing control apparatus comprises a main memory for storing a plurality of record data serially arranged with a record positioning code between the record data, each record data including a plurality of word data serially arranged with a word positioning code between the word data, the word data each including at least one character data; and a processing memory means having a row/column matrix which is address designated by the outputs of row and column counters for permitting each word data in the record data to be stored in its address. A specific row of a heading column in the matrix in the processing memory means is address designated to permit the address position data in this row to be sequentially shifted in a row direction. Specific codes, each written in an address position following a final character data, in the word data are counted by a counter while an address shift is effected in a column direction from an address position in the specific row. A word order memory is adapted to beforehand store a numerical value corresponding to the order of a word data to be selected from the record data and a coincidence circuit is adapted to detect a coincidence between the number of specific codes counted by the counter and a numerical value stored in the word order memory. When a coincidence output is generated from the coincidence circuit a data readout from the main memory to the processing memory means is inhibited by the coincidence output of the coincidence circuit and only a word data corresponding to a selected word order is delivered to the data processing memory.

9 Claims, 6 Drawing Figures

1

DATA PROCESSING CONTROL APPARATUS WITH SELECTIVE DATA READOUT

BACKGROUND OF THE INVENTION

This invention relates to a data processing control apparatus capable of effectively extracting from a record data comprised of a plurality of word data a necessary word data which is necessary for data processing.

Data as processed in a computer etc. comprises a record data which includes a plurality of word data, each word data including at least one character data. A main memory stores many such record data. That is, the main memory stores a plurality of serially arranged record data, each of which comprises a plurality of serially arranged word data. Each word data in the record data is serially read out by a readout instruction from the main memory in the order in which the record data are stored in the main memory. Out of each record data so read out from the main memory a specific word data is extracted for an arithmetic operation such as addition so that various data processing operations can be effected. That is, it is necessary to extract a specific word data from each record data during the readout of the record data from the main memory. A specific word extracting means is adapted to, for example, count the word data starting with the head of the record data and read out only a word data corresponding to a specific order. It is, however, difficult to effect such an operation during the readout of the record data from the main memory. Where a different word length is involved, such a control adds to complexity. A complicated control is also necessary in a case where a plurality of word data are extracted from one record data for data processing.

It is accordingly the object of this invention to provide a data processing control apparatus capable of selecting a word data from a record data read out from a main memory so as to effect data processing and capable of delivering only a selected word data to a data processing device.

SUMMARY OF THE INVENTION

According to the present invention a data processing control apparatus comprises a main memory means for storing a plurality of record data serially arranged with a record positioning code between the record data, each record data including a plurality of word data serially arranged with a word positioning code between the word data, each word data including at least one character. A processing memory means is coupled to the main memory means for storing the record data read out of the main memory means in the form of rows containing words each having a given number of characters falling within a specified range, and a plurality of columns. An address control means is provided for effecting the shifting of characters through a row and also the shifting of a column itself. Writing means is coupled to the main memory means and to the processing memory means for writing the word data read out from the main memory means in the processing memory means, the writing means including word positioning code detecting means and control means for shifting address data of the processing memory means by the address control means in the column direction upon each word data being read out of the main memory means, while sequentially shifting characters in the word data and a word positioning code following the word data in the row direction; specific column address designating means for, after the word data and subsequent word positioning code from the main memory means is stored in the processing memory means, designating by said address control means that specific row address position of the column where the word positioning code is stored; specific code writing means for effecting a write-in of the specific code in the specific row address position, the specific code being used to selectively detect a word data in a record data stored in the processing memory means; and record positioning code-detecting means and control means associated therewith for enabling a plurality of word data in the record data to be continuously written, until the record positioning code is detected.

A data processing control apparatus according to this invention permits a necessary word data to be selected by a simple control means from a plurality of record data stored in a main memory and, even if a different word length is involved, word data can be effectively read out in their original form.

BRIEF DESCRIPTION OF THE DRAWING

This invention will be further described by way of example by referring to the accompanying drawings in which.

DETAILED DESCRIPTION OF THE INVENTION

Figure 1:
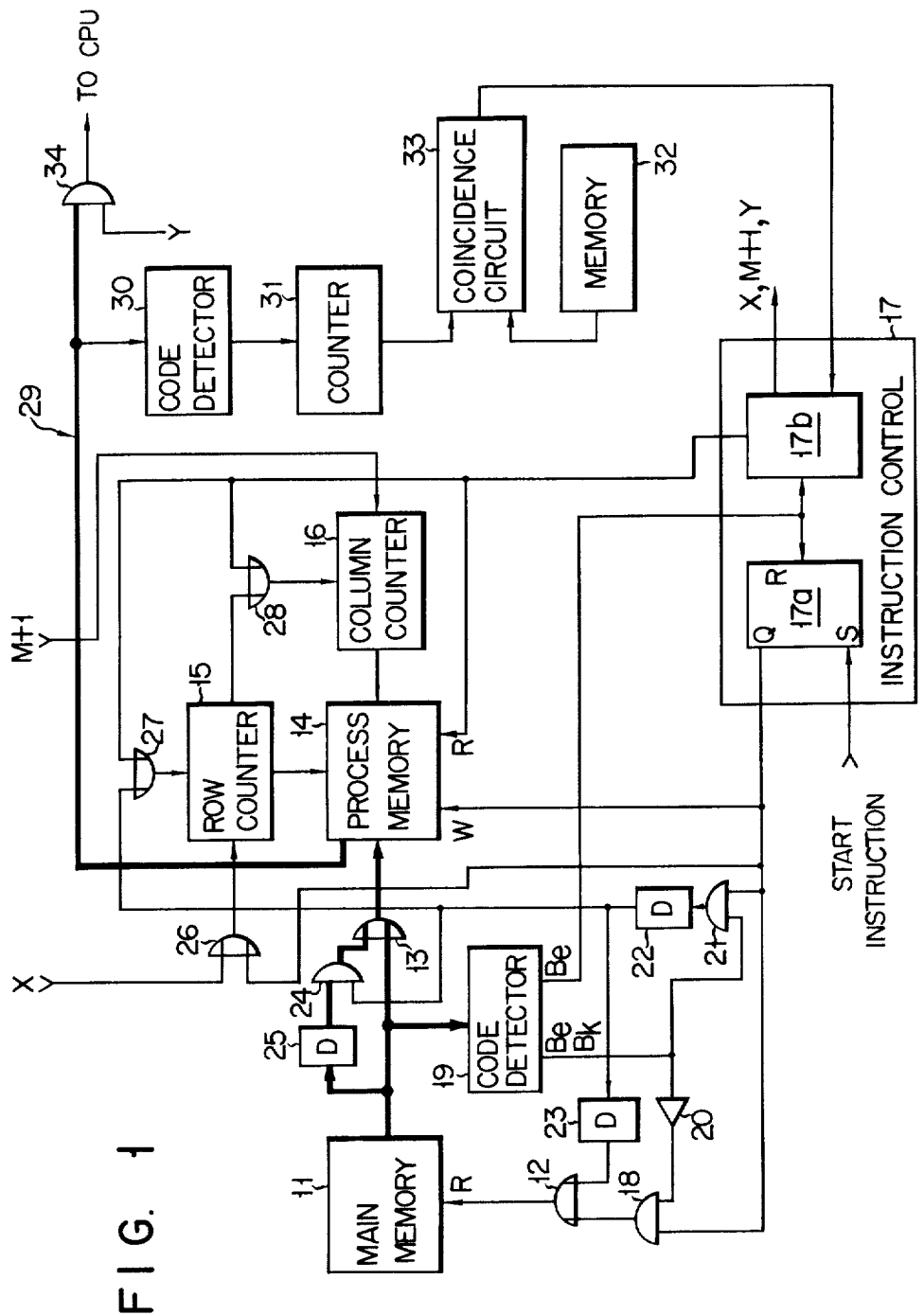
FIG. 1 is a block diagram showing a data processing control apparatus according to one embodiment of this invention.

In FIG. 1, 11 is a main memory such as a disc, drum, magnetic tape etc. The main memory 11 stores a plurality of record data series-arranged with a record positioning code [Be] between each record data, each record data comprising a plurality of word data series-arranged with a word positioning code [Bk] between each word data. One record data can be expressed as follows:

Be rr . . . Bk rr . . . Bk . . . rr Be where r denotes a character constituting part of the word.

The data in the main memory 11 is read out by a readout instruction from an OR circuit 12 and supplied through an OR circuit 13 to a data processing memory 14 such as a RAM etc. The memory 14 is a matrix memory whose address positions are designated by a row counter 15 and column counter 16. The read/write operation is effected with respect to the designated address position in the matrix memory.

17 is a control section for data processing and a variety of instruction signals are generated from the control section 17. The control section 17 includes an instruction circuit 17a comprising an R-S flip-flop circuit and adapted to transfer the data of the main memory 11 to the data processing memory 14, and a column designating circuit 17b for designating a column address position of the memory 14. The memory 14 has a character memory capacity of 16 × 16 = 256. The output of the instruction circuit 17a is fed to the OR circuit 12 through an AND circuit 18 and as a write instruction W to the memory 14. A positioning code detector 19 is adapted to detect the record positioning code [Be] and word positioning code [Bk]. The output of the positioning code detector 19 is coupled through an inverter 20 to the AND circuit 18 and the output of the AND circuit 18, together with the output of the instruction circuit 17a, is supplied to an AND circuit 21. When a record positioning code [Be] is detected, the output of the positioning code detector 19 is coupled as a reset instruction to the instruction circuit 17a and as a set instruction to the row designating circuit 17b.

The output of the AND circuit 21 is coupled to a delay circuit 22 and the output of the delay circuit 22 is coupled to the OR circuit 12 through a delay circuit 23 and to an AND circuit 24. The output of the main memory 11 is connected through a delay circuit 25 to the AND circuit 24 and the output of the AND circuit 24 is fed as a write signal to the data processing memory 14 through the OR circuit 13. The row counter 15 is stepped through an OR circuit 26 by either the output of the instruction circuit 17a or an X signal to be later described, and preset through an OR circuit 27 by either a rise of the output of the delay circuit 22 or the output of the column designation circuit 17b. The row counter 16 is stepped through an OR circuit 26 to which is coupled a carry signal from the row counter 15 or a signal from the column designation circuit 17b. The column counter 16 is preset by a later-described M+1 instruction from the row designation circuit 17b.

The output of the data processing memory 14 is taken out through an output line 29 and a word positioning code [Bk] is detected at a positioning code detector 30 upon receipt of the output of the data processing memory 14. A code detection signal of the positioning code detector 30 is counted at a counter 31. A memory 32 stores a numeral value corresponding to a word order to be read out and a count value of the counter 31 is fed, together with a count value of the memory 32, to a coincidence detection circuit where they are compared. A coincidence signal of the coincidence detection circuit is supplied to the row designation circuit 17b.

Figure 2:
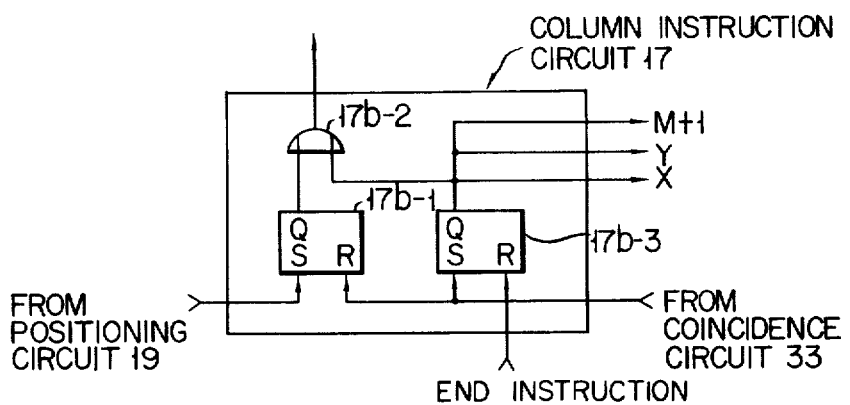
FIG. 2 is a detailed circuit of a column designation circuit in FIG. 1.
Figure 3:
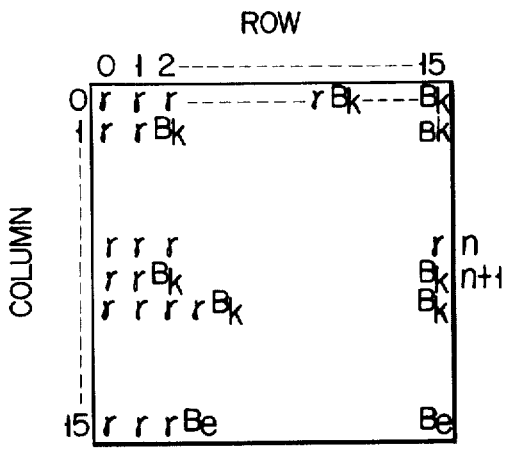
FIG. 3 shows the state in which data is stored in a data processing memory.

The row designation circuit 17b is constructed as shown in FIG. 2. A first R-S flip-flop circuit 17b-1 in the column designation circuit 17b is set by a [Be] detection signal from the positioning code detection circuit 19 and a Q set output of the R-S flip-flop circuit 17b-1 is supplied to an OR circuit 17b-2. A coincidence signal of the coincidence circuit 33 sets a second R-S flip-flop circuit 17b-2 in the column designation circuit 17b and a Q set output of the R-S flip-flop circuit 17b-3 is coupled to an OR circuit 17b-2, as an X signal to the OR circuit 26, as an M + 1 signal to the column counter 16 and a Y signal to an AND circuit 34. Only a to-be-read word data of a record data stored in the data processing memory 14 is supplied to the AND circuit 34 and then to a data processing device, not shown, which is constructed of CPU. An instruction is issued from the instruction circuit 17a in the control section 17 under the condition that a record data comprising a plurality of word data is stored in the main memory 11. Since a code detection signal from the positioning code detection circuit 19 is not present during the issuance of the instruction, the gate of the AND circuit 18 is opened to permit a readout instruction to be supplied to the main memory 11, and a record data stored in the main memory 11 is sequentially read out starting with its heading word in the record data. The output of the instruction circuit 17a is supplied as a write instruction to the data processing circuit 14 and as a count step signal to the row counter 15 through the OR circuit 26, permitting data in the main memory 11 to be written into the data processing device 14. Since in this case the column counter 16 is set to an initial value by an instruction from the control section 17 the heading word is written, while shifting in a column direction, in a position [0] in the row of the matrix memory 14 as shown in FIG. 3. The readout of the heading data from the main memory 11 is completed, and a next succeeding word positioning code [Bk] is read out from the main memory 11 and written into the data processing memory 14. At the same time, the [Bk] code is detected at the code detection circuit 19 and the gate of the AND circuit 18 is closed by the detection output of the code detection circuit 19, stopping the readout of data from the main memory 11. The gate of the AND circuit 21 is opened by the [Bk] detection signal of the code detection circuit 19 and a preset instruction is supplied, by the rise of the output of the delay circuit 22, to the row counter 15 to cause a row address position to be set to a row final position [15] as shown in FIG. 3. The [Bk] code is also supplied through the delay circuit 25 to the AND circuit 24 and it is written into the row final position [15]. That is, the word positioning code [Bk] is written into the final position 15 in the row [0] in the matrix memory as shown in FIG. 3.

After the word positioning code [Bk] has been detected at the positioning code detection circuit 19, the AND circuit 18 is opened to permit the next succeeding word data to be read out from the main memory 11. Since the row counter 15 had been preset to the final position and given an address designation of the positioning code [Bk] to the data processing memory 14, the row counter 15 generates a carry signal. The carry signal of the row counter 15 is coupled through the OR circuit 28 to cause the column counter 16 to be stepped. The row counter 15 is set to the initial value to permit the data of the main memory 11 to be written into the next row [1]. Where the length of a word data stored in the processing memory 14 exceeds a one row capacity of the data processing memory 14, i.e., extends over n to n + 1 rows, one word is written into a plurality of rows in the memory 14, since the column counter 16 is stepped by the carry signals of the row counter 15 and a word positioning code [Bk] is written into a final row position [15] in the row [n + 1] in the memory 14. In this way, data is processed and where a record positioning code [Be] is read out from the main memory 11 a reset instruction is given from the positioning code detector 19 to the control section 17 and the readout of data from the main memory 11 is completed.

Where only a specified word data of data stored as shown in FIG. 3 in the memory 14 is selectively read out, a numerical value corresponding to a word order to be read out (for example, (n + 1) when a word data in the (n + 2) row in the memory is read out) is stored in the memory 32. An instruction signal is generated from the OR circuit 17-2 in the column designating circuit 17b of the control circuit 17 and at the rise of the instruction signal it is supplied through the OR circuit 27 to the row counter 15 to cause the latter to be preset to the final row position corresponding to the row position [15] as shown in FIG. 3. A [+1] signal is coupled through the OR circuit 28 to the column counter 16 to cause the latter to be stepped from an initial value, and a readout instruction is applied to the memory 14. That is, a character stored as shown in FIG. 3 in the row [15] in the memory 14 is sequentially read out. When a word positioning code [Bk] is detected at the positioning code detector 30, the output of the detector 30 is counted. When the count value of the counter 31 coincides with the stored value (n + 1) of the memory 32 an instruction is given from the coincidence detection circuit 33 to the column designation circuit 17b to cause the flip-flop circuit 17b-2 to be set, causing the row counter 15 to be set to an initial value. At the same time, an X signal of the flip-flop circuit 17b-2 is delivered as a step signal to the row counter 15 and an M + 1 signal of the flip-flop circuit 17-2 in the column designation counter 17bis preset to n + 2. A word data corresponding to an order of a (n + 2)th is read out from the memory 32 and it is delivered to the CPU for data processing.

After one record data from the main memory 11 has been so processed, an instruction signal is issued from the instruction circuit 17a in the control section 17 and a next record data is read out from the main memory 11 in the same way as the preceding record data. In this way, repetition is effected.

Figure 5A:
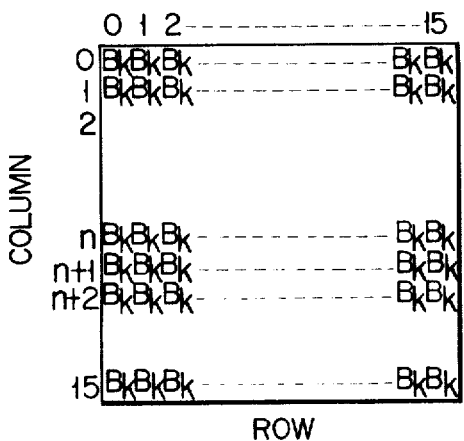
FIGS. 5(a) and 5(b), each, show the state in which data is stored in the data processing control apparatus in FIG. 4.
Figure 5B:
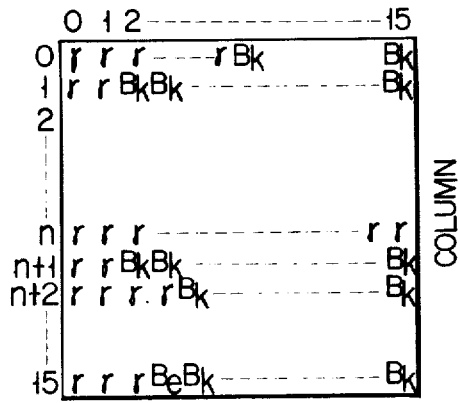
Figure 4:
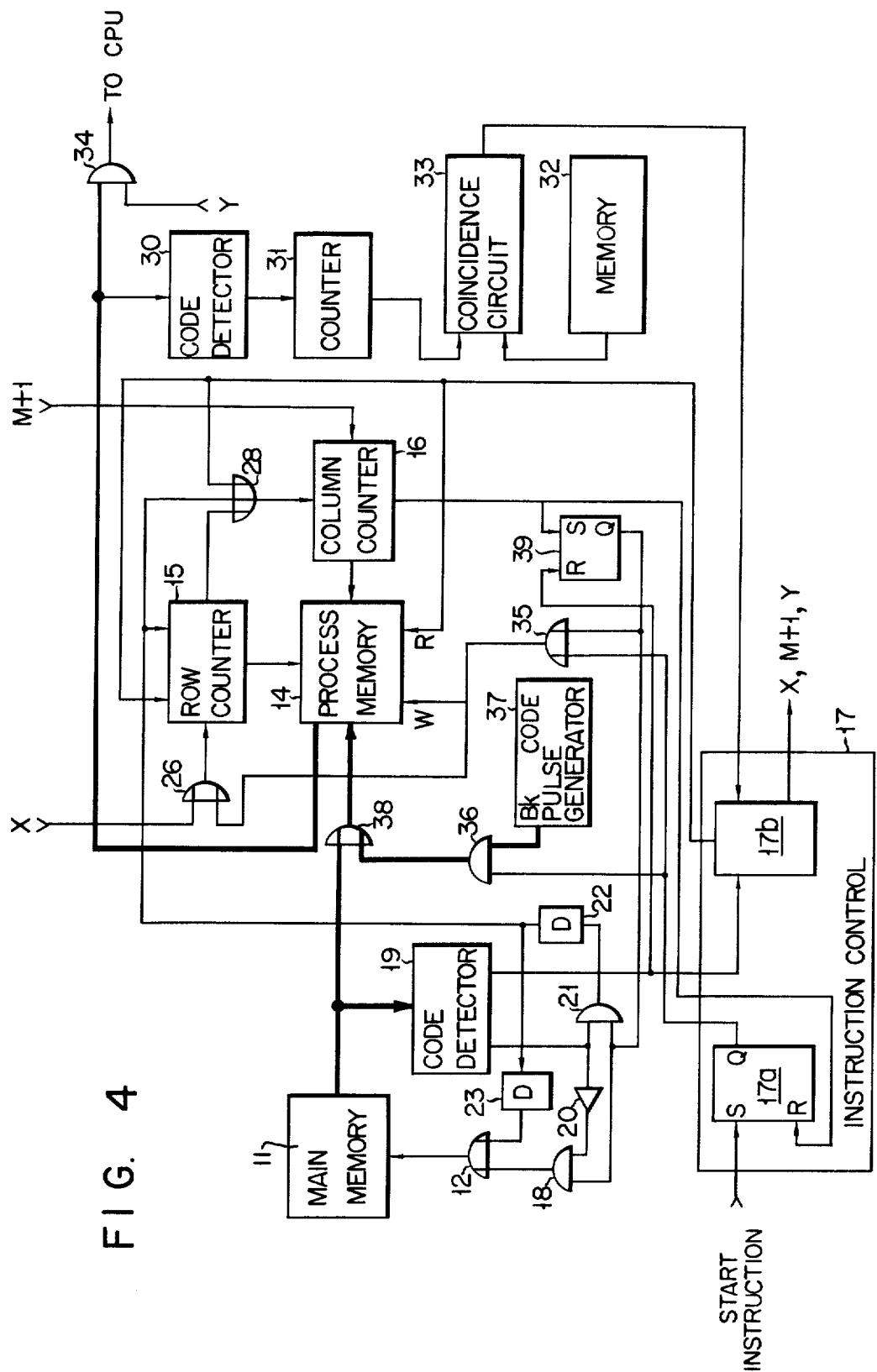
FIG. 4 is a block diagram showing a data processing control apparatus according to another embodiment of this invention.

FIG. 4 shows another embodiment of this invention. As shown in FIG. 5(a) all Bk codes are beforehand written into a processing memory 14 before a record data is read out by a processing instruction from the main memory 11. Similar reference numerals are employed in FIG. 4 to designate similar elements corresponding to those shown in FIG. 3 and further explanation is therefore omitted. When a processing instruction is applied to the control section 17 the flip-flop circuit 17a is set. By the set signal of the flip-flop circuit 17a a write instruction is applied through an OR circuit 35 to the processing device 14 and a [+1] step signal is applied through the OR circuit 26 to the row counter 15. Since a gate signal is also supplied to an AND circuit 36, a Bk code is supplied through an OR circuit 38 to the processing memory 14 for write-in. In this way, the Bk code is sequentially written into all the address positions in the processing memory 14 and by doing so the column counter 16 produces a carry signal. A flip-flop circuit 39 is set by the carry signal of the column counter 16. A set signal of the flip-flop circuit 39 is supplied to an AND circuit 18, AND circuit 21 and OR circuit 35 and in consequence a record data is delivered, as in the case of the first embodiment, from the main memory 11 to the processing memory 14 as shown in FIG. 5(b). When a Be code is detected at the positioning code detector 19, a detection output of the positioning code detector 19 is supplied to the flip-flop circuit 39 and column designation circuit 17b. This causes the flip-flop 39 to be reset and the column designation circuit 17b to be set. A word data in the record data stored in the processing data is read out through the AND circuit 34 as explained in connection with FIG. 3. A flip-flop circuit 17a in the control circuit 17 is reset by the carry signal of the column counter 16.

What is claimed is:

1. A data processing control apparatus comprising: main memory means for storing a plurality of record data serially arranged with a record positioning code between the record data, each record data including a plurality of word data serially arranged with a word positoning code between the word data, said word data including at least one character;

processing memory means coupled to said main memory means for storing the record data read out of said main memory means, said processing memory means including a plurality of rows for storing words, each word having a given number of characters falling within a specified range, a plurality of columns, and address control means for effecting the shifting of characters through a row and also the shifting of a column itself; and writing means coupled to said main memory means and to said processing memory means for writing the word data read out from said main memory means into said processing memory means, said writing means including:

word positioning code detecting means and control means associated therewith coupled to said address control means for shifting address data of said processing memory means via said address control means in the column direction responsive to each word data being read out of said main memory means, and for sequentially shifting characters in the word data and a word positioning code following the word data in the row direction;

specific column address designating means coupled to said address control means for, after a word data and subsequent word positioning code from said main memory means is stored in said processing memory means, designating via said address control means that specific row address position of the column where the word positioning code is stored;

specific code writing means for effecting a write-in of said specific code in said specific row address position, said specific code being used to selectively detect a word data in a record data stored in said processing memory means; and record positioning code-detecting means and control means associated therewith coupled to said address control means for enabling a plurality of word data in the record data to be continuously written, until a record positioning code is detected, and for then inhibiting writing of data.

2. A data processing control system according to claim 1, further comprising reading means coupled to said processing memory means for reading only the word data designated from among one record data stored in said processing memory means, said reading means including:

storing means for storing a value corresponding to the column address position of a word data to be read from among one record data stored in said processing memory means;

address position designating means for designating said specific row address position of the first column of said processing memory means;

sequential reading means for sequentially reading said specific code while sequentially shifting column address data when said specific row address position is designated;

counting means coupled to said sequential reading means for counting the number of specific codes read out by said sequential reading means; and means coupled to said counting means and to said storing means for comparing a value counted by said counting means with said value stored in said storing means to produce an output corresponding to the word data.

3. A data processing control apparatus according to claim 1, wherein said specific code to be stored in the data processing memory comprises said word positioning code.

4. A data processing control apparatus according to claim 1, wherein said specific code is written into an address in a final row of each column of said processing memory means.

5. A data processing control apparatus comprising:
   main memory means for storing a plurality of record data serially arranged with a record positioning code between the record data, each record data including a plurality of word data serially arranged with a word positioning code between the word data, said word data including at least one character;
   processing memory means coupled to said main memory means for storing the record data read out of said main memory means, said processing memory means including a plurality of rows for storing words, each word having a given number of characters falling within a specified range, a plurality of columns, and address control means for effecting the shifting of characters through a row and also the shifting of a column itself;
   specific code writing means coupled to said processing memory means for beforehand storing a specific code in a predetermined row of all columns of said processing memory means via said address control means, the specific code being used to selectively detect word data in one record data stored in said processing memory means; and
   writing means coupled to said main memory means and to said processing memory means for writing the word data from said main memory means into said processing memory means after said specific code is written by said specific code writing means into said processing memory means, said writing means including:
   word positioning code detecting means and control means associated therewith coupled to said address control means for shifting the address data of said processing memory means via said address control means in the column direction responsive to each word data being read out of said main memory, and for sequentially shifting characters in the word data and the sequential word positioning code in the row direction for storage; and
   record positioning code-detecting means and control means associated therewith for enabling a plurality of word data in the record data to be continuously written, until the record positioning code is detected, and for then inhibiting writing of data.

6. A data processing control apparatus according to claim 5, further comprising reading means coupled to said processing memory means for reading only the word data designated from among one record data which is stored in said processing memory means, said reading means including:
   storing means for storing a value corresponding to that column address position of a word data to be read from among one record data stored in said processing memory means;
   address position designating means for designating said specific row address position of a first column of said processing memory means;
   readout means for sequentially reading out said specific code while sequentially shifting column address data when said specific row address position is designated by said specific code;
   counting means coupled to said readout means for counting the number of specific codes read out by said readout means; and
   comparing means coupled to said counting means and to said storing means for comparing a value counted by said counting means with said value stored in said storing means to produce an output corresponding to the word data.

7. A data processing control apparatus according to claim 5, wherein said specific code to be stored in the data processing memory comprises said word positioning code.

8. A data processing control apparatus comprising:
   main memory means for storing a plurality of record data serially arranged with a record positioning code between the record data, each record data including a plurality of word data serially arranged with a word positioning code between the word data, said word data including at least one character;
   processing memory means coupled to said main memory means for storing the record data read out of said main memory means, said processing memory means including a plurality of rows for storing words, each word having a given number of characters falling within a specified range, a plurality of columns, and address control means for effecting the shifting of characters through a row and also the shifting of a column itself;
   specific code writing means coupled to said processing memory means for beforehand storing a specific code in all rows of all columns of said processing memory means via said address control means, the specific code being used to selectively detect word data in one record stored in said processing memory means; and
   writing means coupled to said main memory means and to said processing memory means for writing the word data from said main memory means into said processing memory means after said specific code is written by said specific code writing means into said processing memory means, said writing means including:
   word positioning code detecting means and control means associated therewith coupled to said address control means for shifting the address data of said processing memory means via said address control means in the column direction and for sequentially shifting characters in the word data and the word positioning code following said word data in the row direction for storage; and
   record positioning code detecting means and control means associated therewith for enabling a plurality of word data in a record to be continuously written, until the record positioning code is detected, and for then inhibiting writing of data.

9. A data processing control apparatus according to claim 8, further comprising reading means coupled to said processing memory means for reading only the word data designated from among one record data which is stored in said processing memory means, said reading means including:
   storing means for storing a value corresponding to a column address position of a word data to be read from among one record data which is stored in said processing memory means;

designating means for designating said specific row address position of a first column of said processing memory means;

readout means for sequentially reading out said specific code while sequentially shifting the column address data when said specific row address position is designated;

counting means coupled to said readout means for counting the number of specific codes read out by said readout means; and means coupled to said counting means and to said storing means for comparing a value counted by said counting means with said value stored in said storing means to produce an output corresponding to the word data.

* * * * *